(12) United States Patent
Jiang (10) Patent No.: US 11,906,941 B2
(45) Date of Patent: *Feb. 20, 2024

(54) INTELLIGENT THREE-WAY SWITCH SYSTEMS

(71) Applicant: Mitchell M. Jiang, Alpharetta, GA (US)

(72) Inventor: Mitchell M. Jiang, Alpharetta, GA (US)

(*) Notice: Subject to any disclaimer, the term of this patent is extended or adjusted under 35 U.S.C. 154(b) by 233 days.

This patent is subject to a terminal disclaimer.

(21) Appl. No.: 17/677,967

(22) Filed: Feb. 22, 2022

(65) Prior Publication Data

US 2023/0266727 A1 Aug. 24, 2023

(51) Int. Cl.
*G05B 15/02* (2006.01)

(52) U.S. Cl.
CPC ...... *G05B 15/02* (2013.01); *G05B 2219/2642* (2013.01)

(58) Field of Classification Search
CPC .......................... G05B 15/02; G05B 2219/2642
USPC .......................................................... 307/112
See application file for complete search history.

(56) References Cited

U.S. PATENT DOCUMENTS

| | | | | |
|---|---|---|---|---|
| 9,325,516 B2* | 4/2016 | Pera | ..................... | H04L 12/2809 |
| 10,292,338 B2* | 5/2019 | Haughton | .............. | A01G 7/045 |
| 2016/0216700 A1* | 7/2016 | Fan | ......................... | G05B 15/02 |
| 2018/0188706 A1* | 7/2018 | Wootton | ............ | G05B 19/0423 |
| 2019/0066942 A1* | 2/2019 | Fu | .............................. | H01H 9/54 |
| 2020/0295597 A1* | 9/2020 | Wootton | ........... | H02J 13/00007 |
| 2023/0121575 A1* | 4/2023 | Baker | ....................... | H01H 9/16 |
| | | | | 327/408 |
| 2023/0266727 A1* | 8/2023 | Jiang | ...................... | H05B 47/10 |
| | | | | 700/131 |
| 2023/0268141 A1* | 8/2023 | Jiang | ...................... | H01H 9/563 |
| | | | | 200/5 R |

* cited by examiner

*Primary Examiner* — Alfonso Perez Borroto
(74) *Attorney, Agent, or Firm* — Ming Jiang; MM IP SERVICES LLC (57) ABSTRACT

Present invention relates to intelligent three-way switch system having intelligent three-way master switch, intelligent three-way slave switch, and load. In certain embodiments, intelligent three-way master switch includes a DC power supply, a live wire relay, and a switch control unit, and intelligent three-way slave switch includes a switch control unit. The DC power supply provides low voltage DC power to live wire relay and switch control units. When at least one of switch control unit of the intelligent three-way master switch and switch control unit of the intelligent three-way slave switch receives switch control instructions, the switch control unit generates a negative pulse at the switch control unit first terminal, and the negative pulse is transmitted to the live wire relay. The live wire relay detects the negative pulse generated at the switch control unit first terminal and turns "ON" or "OFF" the electrical power to the load.

20 Claims, 6 Drawing Sheets

INTELLIGENT THREE-WAY SWITCH SYSTEMS

FIELD

The present disclosure generally relates to electrical switch system, and more particularly to intelligent three-way switch systems.

BACKGROUND

Figure 6:
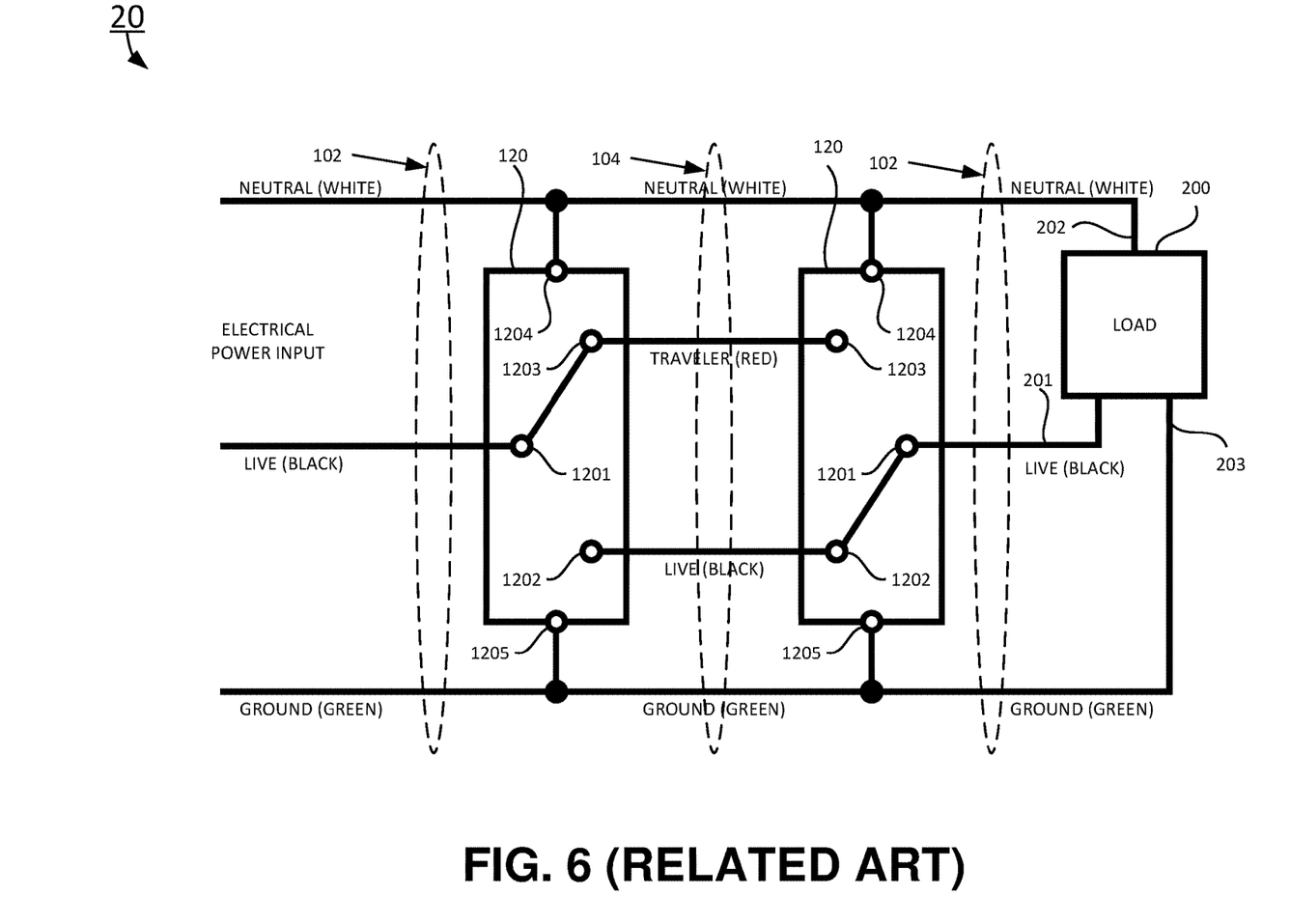
FIG. 6 schematically shows a conventional three-way switch system.

Traditionally, there are many switches for lights, and household appliances. In most cases, each of the lights and household appliances is controlled by one or more switches. In FIG. 6, a conventional three-way switch system is shown. An electrical power input is connected to two three-way switches 120 and to a load 200 in serial. The electrical power input connects to a first three-way switch 120 with a three-wire electrical cable 102, the first three-way switch 120 connects to a second three-way switch 120 with a four-wire electrical cable 104, and the second three-way switch 120 connects to the load with another three-wire electrical cable 102. Intelligent switches are capable of controlling lights and appliances via wireless networks, Wi-Fi networks, motion sensors, light sensors, touch panel switches, in addition to traditional push button switches. Intelligent switches become more sophisticated and more expensive to manufacture. For a three-way switch circuit, having two identical intelligent three-way switches seems a waste of resource. It is desirable to develop a master-slave switch device such that the master switch includes more sophisticated control device, and the slave switch includes only minimum device and less expensive to make, and the master-slave combination can achieve the same functionality of two intelligent three-way switches.

Therefore, a heretofore unaddressed needs still exist in the art to address the aforementioned deficiencies and inadequacies.

SUMMARY

In one aspect, the present disclosure relates to an intelligent three-way master switch. In certain embodiments, the intelligent three-way master switch includes: a master switch first live terminal, a master switch second live terminal, a master switch traveler terminal, a master switch neutral terminal, a master switch ground terminal, a direct current (DC) power supply, a live wire relay, a switch control unit, and a live input terminal selector. The DC power supply receives electrical power through the live input terminal selector, and provides low DC voltage for the operation of the intelligent three-way master switch. The live wire relay detects a negative pulse from the switch control unit, and turns "ON" or "OFF" the electrical power between the master switch first live terminal and the master switch second live terminal. The switch control unit receives switch control instructions and controls the live wire relay. The live input terminal selector includes a first input terminal, a second input terminal, and an output terminal. When an electrical power input is connected through a three-wire electrical cable, the first input terminal is connected to the output terminal. When the electrical power input is connected through a four-wire electrical cable, the second input terminal is connected to the output terminal.

In certain embodiments, when the electrical power input is connected through the three-wire electrical cable to the master switch first live terminal, the master switch neutral terminal, and the master switch ground terminal respectively, the electrical power output is connected through the four-wire electrical cable to the master switch second live terminal, the master switch traveler terminal, the master switch neutral terminal, and the master switch ground terminal respectively.

In certain embodiments, when the electrical power input is connected through the four-wire electrical cable to the master switch second live terminal, the master switch traveler terminal, the master switch neutral terminal, and the master switch ground terminal respectively, the electrical power output is connected through the three-wire electrical cable to the master switch first live terminal, the master switch neutral terminal, and the master switch ground terminal respectively.

In certain embodiments, the DC power supply includes: a live wire terminal connected to the live wire of the electrical power input, and a neutral wire terminal connected to neutral wire of the electrical power input, and a low voltage DC output terminal. The low voltage DC output terminal provides the low voltage DC for the operation of the intelligent three-way master switch.

In certain embodiments, the switch control unit includes: a push button switch; a Wi-Fi controlled switch; a light sensor switch; a motion sensor switch; a touch panel switch; and any combination of these switch devices.

In certain embodiments, the switch control unit includes: a switch control unit first terminal and a switch control unit second terminal. The switch control unit first terminal is connected to the low voltage DC output terminal to received DC power supply. When the switch control unit receives switch control instructions, the switch control unit generates a negative pulse at the switch control unit first terminal.

In certain embodiments, the live wire relay includes: DC control terminals having a positive DC control terminal and a negative DC control terminal, and live wire switch terminals having a first live wire terminal and a second live wire terminal. When the live wire relay is in an "ON" state, the first live wire terminal and the second live wire terminal are connected, and when the live wire relay is in an "OFF" state, the first live wire terminal and the second live wire terminal are disconnected.

In certain embodiments, when the switch control unit receives switch control instructions, and the negative pulse at the switch control unit first terminal is generated, the live wire relay detects the negative pulse generated and changes the state, when the live wire relay is in the "ON" state, the first live wire terminal and the second live wire terminal are disconnected, and when the live wire relay is in the "OFF" state, the first live wire terminal and the second live wire terminal are connected.

In another aspect, the current disclosure relates to an intelligent three-way slave switch. In certain embodiments, the intelligent three-way slave switch includes: a slave switch first live terminal, a slave switch second live terminal, a slave switch traveler terminal, a slave switch neutral terminal, a slave switch ground terminal, and a switch control unit. The switch control unit includes: a switch control unit first terminal and a switch control unit second terminal. The switch control unit first terminal is connected to the slave switch traveler terminal to receive a low voltage DC power supply. When the switch control unit receives switch control instructions, the switch control unit generates a negative pulse at the switch control unit first terminal and the negative pulse is sent to an intelligent three-way master switch to turn "ON" or "OFF" the electrical power supply through the slave switch traveler terminal.

In certain embodiments, when the electrical power input is connected through a three-wire electrical cable to the slave switch first live terminal, the slave switch neutral terminal, and the slave switch ground terminal respectively, the electrical power output is connected through a four-wire electrical cable to the slave switch second live terminal, the slave switch traveler terminal, the slave switch neutral terminal, and the slave switch ground terminal respectively.

In certain embodiments, when the electrical power input is connected through the four-wire electrical cable to the slave switch second live terminal, the slave switch traveler terminal, the slave switch neutral terminal, and the slave switch ground terminal respectively, the electrical power output is connected through the three-wire electrical cable to the slave switch first live terminal, the slave switch neutral terminal, and the slave switch ground terminal respectively.

In certain embodiments, the switch control unit includes: a push button switch; a Wi-Fi controlled switch; a light sensor switch; a motion sensor switch; a touch panel switch; and any combination of these switch devices.

In yet another aspect, the current disclosure relates to an intelligent three-way switch system. In certain embodiments, the intelligent three-way switch system includes: an intelligent three-way master switch, an intelligent three-way slave switch, and a load. The intelligent three-way master switch includes: a master switch first live terminal, a master switch second live terminal, a master switch traveler terminal, a master switch neutral terminal, a master switch ground terminal, a direct current (DC) power supply, a live wire relay, a switch control unit, and a live input terminal selector. The intelligent three-way slave switch includes: a slave switch first live terminal, a slave switch second live terminal, a slave switch traveler terminal, a slave switch neutral terminal, a slave switch ground terminal, and a switch control unit. The load includes: a load live terminal, a load neutral terminal, and a load ground terminal. The intelligent three-way switch system controls an electrical power supply to the load. The intelligent three-way master switch, the intelligent three-way slave switch, and the load are connected in serial. The DC power supply provides DC power to the live wire relay, the switch control unit of the intelligent three-way master switch, and the switch control unit of the intelligent three-way slave switch.

In one embodiment, the intelligent three-way master switch connects to the electrical power input through a three-wire electrical cable; the intelligent three-way slave switch connects to the intelligent three-way master switch through a four-wire electrical cable; and the load connects to the intelligent three-way slave switch through the three-wire electrical cable.

In another embodiment, the intelligent three-way slave switch connects to the electrical power input through the three-wire electrical cable; the intelligent three-way master switch connects to the intelligent three-way slave switch through the four-wire electrical cable; and the load connects to the intelligent three-way master switch through the three-wire electrical cable.

In certain embodiments, the DC power supply includes: a live wire terminal connected to the live wire of the electrical power input, and a neutral wire terminal connected to neutral wire of the electrical power input, and a low voltage DC output terminal. The low voltage DC output terminal provides the low DC voltage for the operation of the intelligent three-way switch system.

In certain embodiments, the switch control unit includes: a push button switch; a Wi-Fi controlled switch; a light sensor switch; a motion sensor switch; a touch panel switch; and any combination of these switch devices.

In certain embodiments, when at least one of the switch control unit of the intelligent three-way master switch and the switch control unit of the intelligent three-way slave switch receives switch control instructions, the switch control unit generates a negative pulse at the switch control unit first terminal, and the live wire relay detects the negative pulse generated at the switch control unit first terminal and turns "ON" or "OFF" the electrical power to the load.

In certain embodiments, the live wire relay includes: DC control terminals having a positive DC control terminal and a negative DC control terminal, and live wire switch terminals having a first live wire terminal and a second live wire terminal. When the live wire relay is in an "ON" state, the first live wire terminal and the second live wire terminal are connected. When the live wire relay is in an "OFF" state, the first live wire terminal and the second live wire terminal are disconnected.

In certain embodiments, when at least one of the switch control unit of the intelligent three-way master switch and the switch control unit of the intelligent three-way slave switch receives switch control instructions, and the negative pulse at the switch control unit first terminal is generated, the live wire relay detects the negative pulse generated and changes the state. When the live wire relay is in the "ON" state, the first live wire terminal and the second live wire terminal are disconnected. When the live wire relay is in the "OFF" state, the first live wire terminal and the second live wire terminal are connected.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 1:
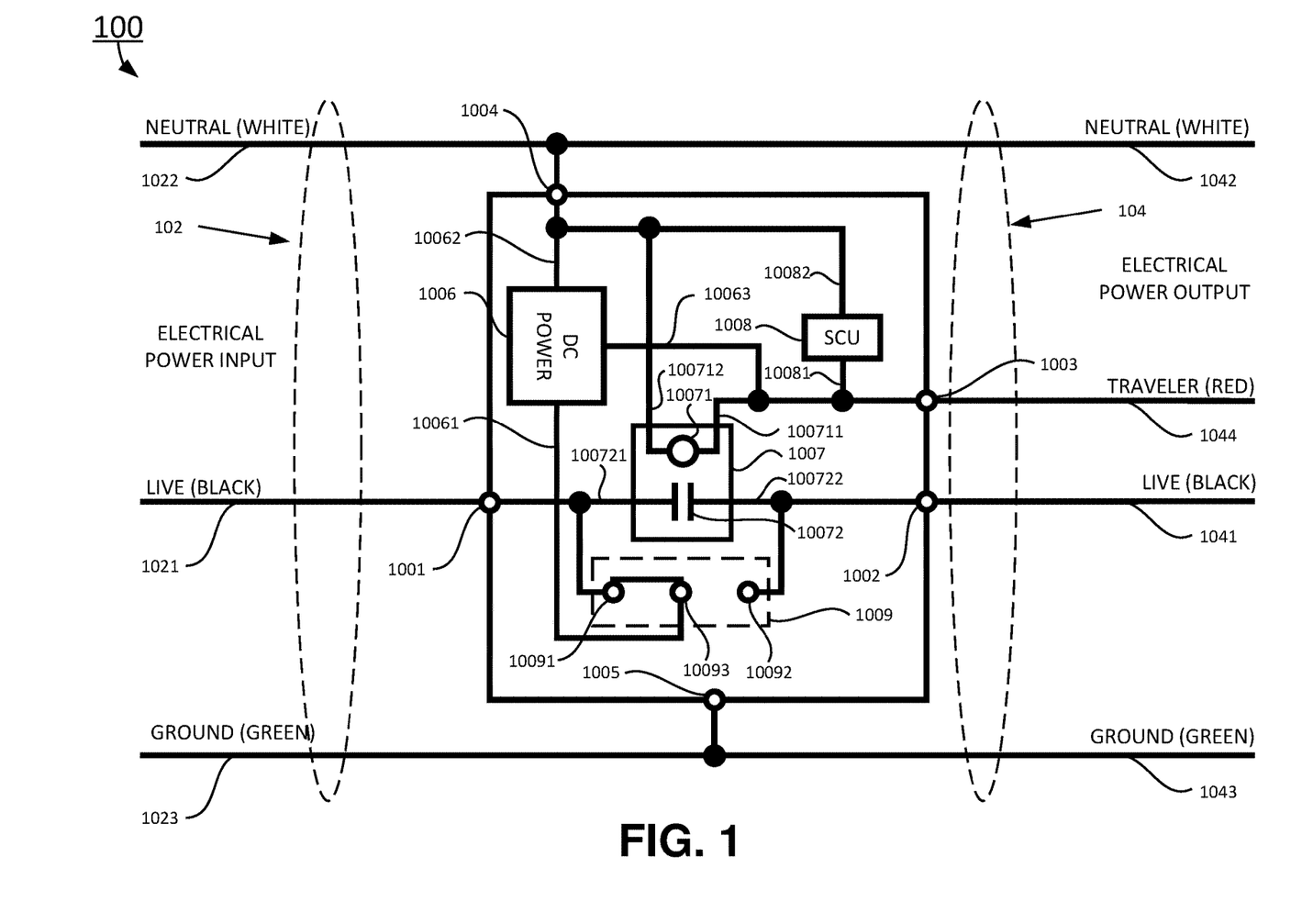
FIG. 1 schematically shows an intelligent three-way master switch according to one embodiment of the present disclosure.

In one aspect, the present disclosure relates to an intelligent three-way master switch 100. In one embodiment, as shown in FIG. 1, the intelligent three-way master switch 100 is used in a place of the first three-way switch 120 shown in FIG. 6. An electrical power input is connected to the intelligent three-way master switch 100 with a three-wire electrical cable 102. An electrical power output is connected to an intelligent three-way slave switch 110 with a four-wire electrical cable 104.

Figure 2:
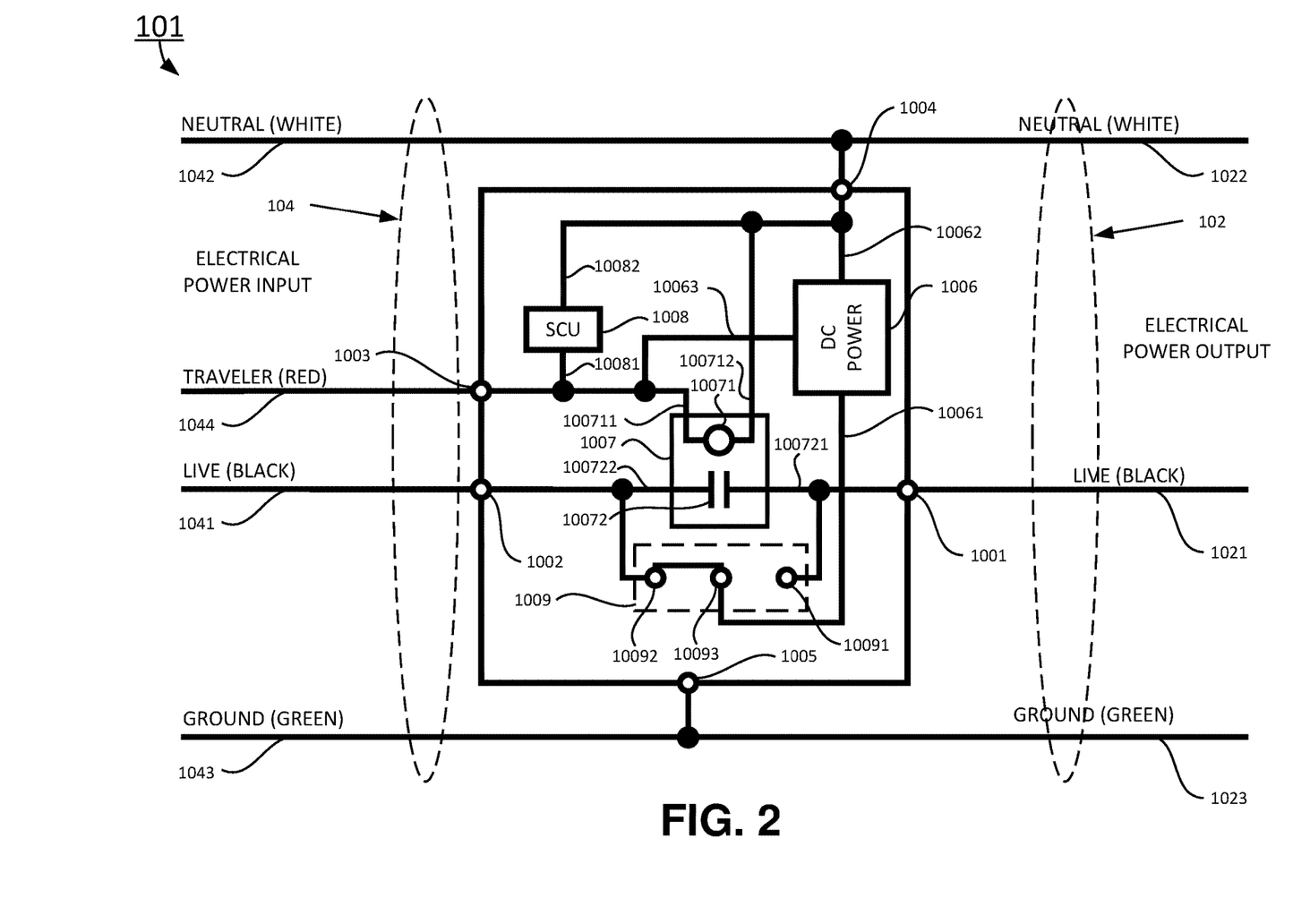
FIG. 2 schematically shows another intelligent three-way master switch according to another embodiment of the present disclosure.

In another embodiment, as shown in FIG. 2, the intelligent three-way master switch 100 is used in a place of the second three-way switch 120 shown in FIG. 6. The electrical power input is connected to the intelligent three-way master switch 100 with the four-wire electrical cable 104. The electrical power output is connected to a load 200 with a three-wire electrical cable 102.

The three-wire electrical cable 102 includes: the live wire (black) 1021, the neutral wire (white) 1022, and the ground wire (green) 1023. The four-wire electrical cable 104 includes: the live wire (black) 1041, the neutral wire (white) 1042, the ground wire (green) 1043, and the traveler wire (red) 1044.

When the intelligent three-way master switch 100 is used to replace an existing three-way switch circuit, it is important that the intelligent three-way master switch 100 may be used to replace any one of the first and the second three-way switch 120 as shown in FIG. 6, without extensive examination of the existing three-way switch circuit.

In certain embodiments, the intelligent three-way master switch 100 includes: a master switch first live terminal 1001, a master switch second live terminal 1002, a master switch traveler terminal 1003, a master switch neutral terminal 1004, a master switch ground terminal 1005, direct current (DC) power supply 1006, a live wire relay 1007, a switch control unit 1008, and a live input terminal selector 1009. The DC power supply 1006 receives electrical power through the live input terminal selector 1009, and provides low DC voltage for the operation of the intelligent three-way master switch 100. The live wire relay 1007 detects a negative pulse from the switch control unit 1008, and turns "ON" or "OFF" the electrical power between the master switch first live terminal 1001 and the master switch second live terminal 1002. The switch control unit 1008 receives switch control instructions and controls the live wire relay 1007.

In certain embodiments, the live input terminal selector 1009 includes a first input terminal 10091, a second input terminal 10092, and an output terminal 10093. When an electrical power input is connected through a three-wire electrical cable 102, as shown in FIG. 1, the first input terminal 10091 is connected to the output terminal 10093. When the electrical power input is connected through a four-wire electrical cable 104, as shown in FIG. 2, the second input terminal 10092 is connected to the output terminal 10093.

In certain embodiments, as shown in FIG. 1, when the electrical power input is connected through the three-wire electrical cable 102 to the master switch first live terminal 1001, the master switch neutral terminal 1004, and the master switch ground terminal 1005 respectively, the electrical power output is connected through the four-wire electrical cable 104 to the master switch second live terminal 1002, the master switch traveler terminal 1003, the master switch neutral terminal 1004, and the master switch ground terminal 1005 respectively.

In certain embodiments, as shown in FIG. 2, when the electrical power input is connected through the four-wire electrical cable 104 to the master switch second live terminal 1002, the master switch traveler terminal 1003, the master switch neutral terminal 1004, and the master switch ground terminal 1005 respectively, the electrical power output is connected through the three-wire electrical cable 102 to the master switch first live terminal 1001, the master switch neutral terminal 1004, and the master switch ground terminal 1005 respectively.

In certain embodiments, as shown in FIG. 1 and FIG. 2, the DC power supply 1006 includes: a live wire terminal 10061 connected to the live wire of the electrical power input, and a neutral wire terminal 10062 connected to neutral wire of the electrical power input, and a low voltage DC output terminal 10063. The low voltage DC output terminal 10063 provides the low voltage DC for the operation of the intelligent three-way master switch 100. In certain embodiments, the low voltage DC includes: 3.5V DC, 5.0V DC, 12V DC, 18V DC, and 24V DC.

In certain embodiments, the switch control unit 1008 is a push button switch, and when a user presses the push button, the push button switch generates a negative pulse and the negative pulse is transmitted to the live wire relay 1007 over the low voltage DC output terminal 10063.

In certain embodiments, the switch control unit 1008 is a Wi-Fi controlled switch. The user uses an APP on a smart phone to send a control instruction to the Wi-Fi controlled switch over a communication network or a Wi-Fi area network, and the Wi-Fi controlled switch generates the negative pulse and the negative pulse is transmitted to the live wire relay 1007 over the low voltage DC output terminal 10063.

In certain embodiments, the switch control unit 1008 is a light sensor switch. When light intensity at the light sensor switch reaches a predetermined level, the light sensor switch generates the negative pulse and the negative pulse is transmitted to the live wire relay 1007 over the low voltage DC output terminal 10063.

In certain embodiments, the switch control unit 1008 is a motion sensor switch. When one or more people enter the space around the motion sensor switch, the motion sensor switch detects the motion and generates the negative pulse. The negative pulse is transmitted to the live wire relay 1007 over the low voltage DC output terminal 10063.

In certain embodiments, the switch control unit 1008 is a touch panel switch. When the user touches the touch panel switch, the touch panel switch generates the negative pulse. The negative pulse is transmitted to the live wire relay 1007 over the low voltage DC output terminal 10063.

In certain embodiments, as shown in FIG. 1 and FIG. 2, the switch control unit 1008 includes: a switch control unit first terminal 10081 and a switch control unit second terminal 10082. The switch control unit first terminal 10081 is connected to the low voltage DC output terminal 10063 to receive a low voltage DC power supply. When the switch control unit 1008 receives switch control instructions, the switch control unit 1008 generates a negative pulse at the switch control unit first terminal 10081.

In certain embodiments, the live wire relay 1007 includes: DC control terminals 10071 and live wire switch terminals 10072. The DC control terminals 10071 includes a positive DC control terminal 100711 and a negative DC control terminal 100712. The live wire switch terminals 10072 includes a first live wire terminal 100721 and a second live wire terminal 100722. When the live wire relay 1007 is in an "ON" state, the first live wire terminal 100721 and the second live wire terminal 100722 are connected. When the live wire relay 1007 is in an "OFF" state, the first live wire terminal 100721 and the second live wire terminal 100722 are disconnected.

In certain embodiments, when the switch control unit 1008 receives switch control instructions, and the negative pulse at the switch control unit first terminal 10081 is generated, the live wire relay 1007 detects the negative pulse generated and changes the state. When the live wire relay 1007 is in the "ON" state, the first live wire terminal 100721 and the second live wire terminal 100722 are then disconnected. When the live wire relay 1007 is in the "OFF" state, the first live wire terminal 100721 and the second live wire terminal 100722 are then connected.

Figure 3:
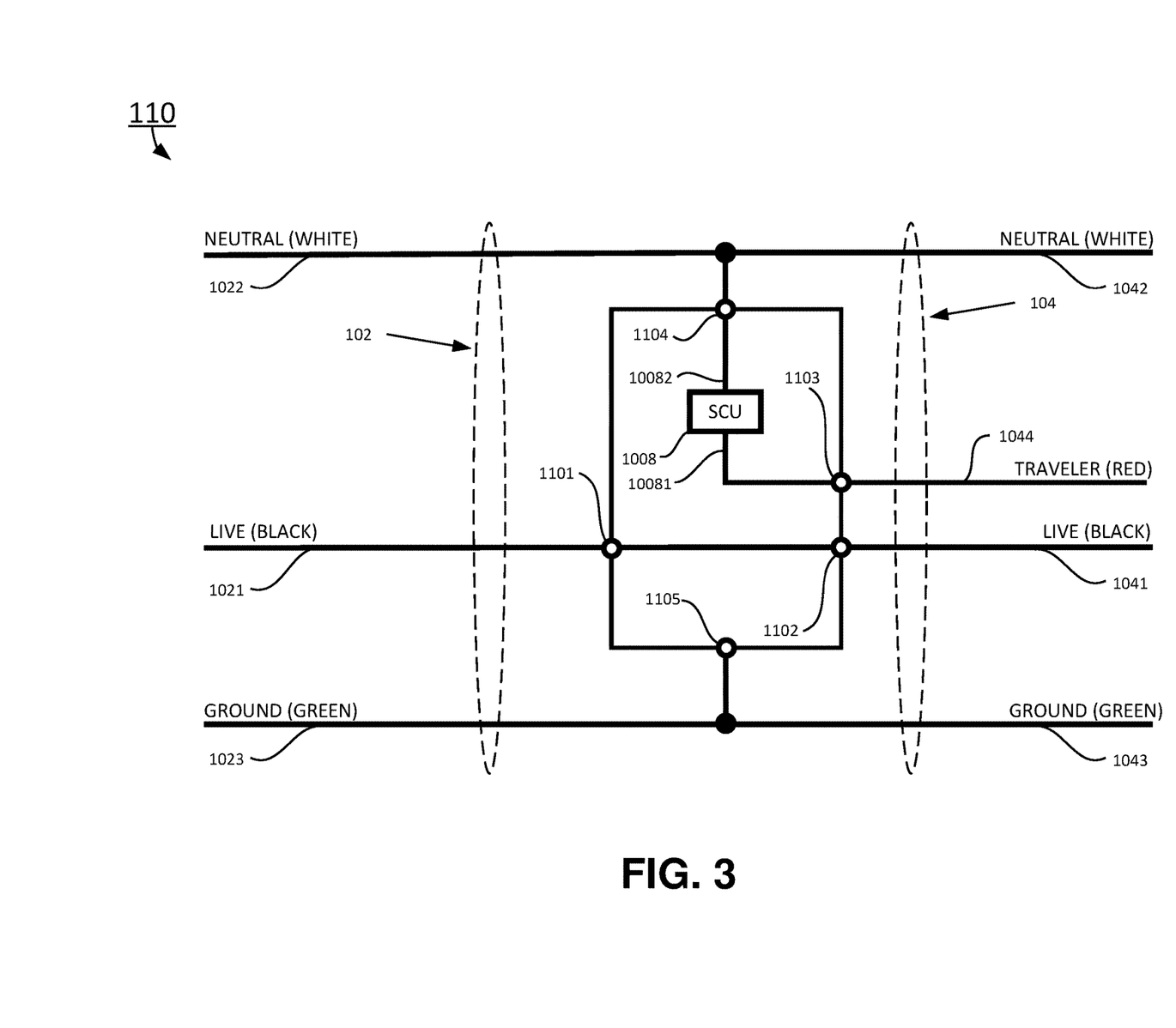
FIG. 3 schematically shows an intelligent three-way slave switch according to certain embodiments of the present disclosure.

In another aspect, as shown in FIG. 3, the current disclosure relates to an intelligent three-way slave switch 110. In certain embodiments, the intelligent three-way slave switch 110 includes: a slave switch first live terminal 1101, a slave switch second live terminal 1102, a slave switch traveler terminal 1103, a slave switch neutral terminal 1104, a slave switch ground terminal 1105, and a switch control unit 1008. The switch control unit 1008 includes: a switch control unit first terminal 10081 and a switch control unit second terminal 10082. The switch control unit first terminal 10081 is connected to the slave switch traveler terminal 1103 to receive a low voltage DC power supply. When the switch control unit 1008 receives switch control instructions, the switch control unit 1008 generates a negative pulse at its switch control unit first terminal 10081 and the negative pulse is sent to an intelligent three-way master switch 100 to turn "ON" or "OFF" the electrical power supply through the slave switch traveler terminal 1103.

In certain embodiments, as shown FIG. 3, when an electrical power input is connected through a three-wire electrical cable 102 to the slave switch first live terminal 1101, the slave switch neutral terminal 1104, and the slave switch ground terminal 1105 respectively. An electrical power output is connected through a four-wire electrical cable 104 to the slave switch second live terminal 1102, the slave switch traveler terminal 1103, the slave switch neutral terminal 1104, and the slave switch ground terminal 1105 respectively.

In certain embodiments, as shown FIG. 3, when the electrical power input is connected through the four-wire electrical cable 104 to the slave switch second live terminal 1102, the slave switch traveler terminal 1103, the slave switch neutral terminal 1104, and the slave switch ground terminal 1105 respectively. The electrical power output is connected through the three-wire electrical cable 102 to the slave switch first live terminal 1101, the slave switch neutral terminal 1104, and the slave switch ground terminal 1105 respectively.

In certain embodiments, the switch control unit 1008 includes: a push button switch; a Wi-Fi controlled switch; a light sensor switch; a motion sensor switch; a touch panel switch; and any combination of these switch devices.

Figure 4:
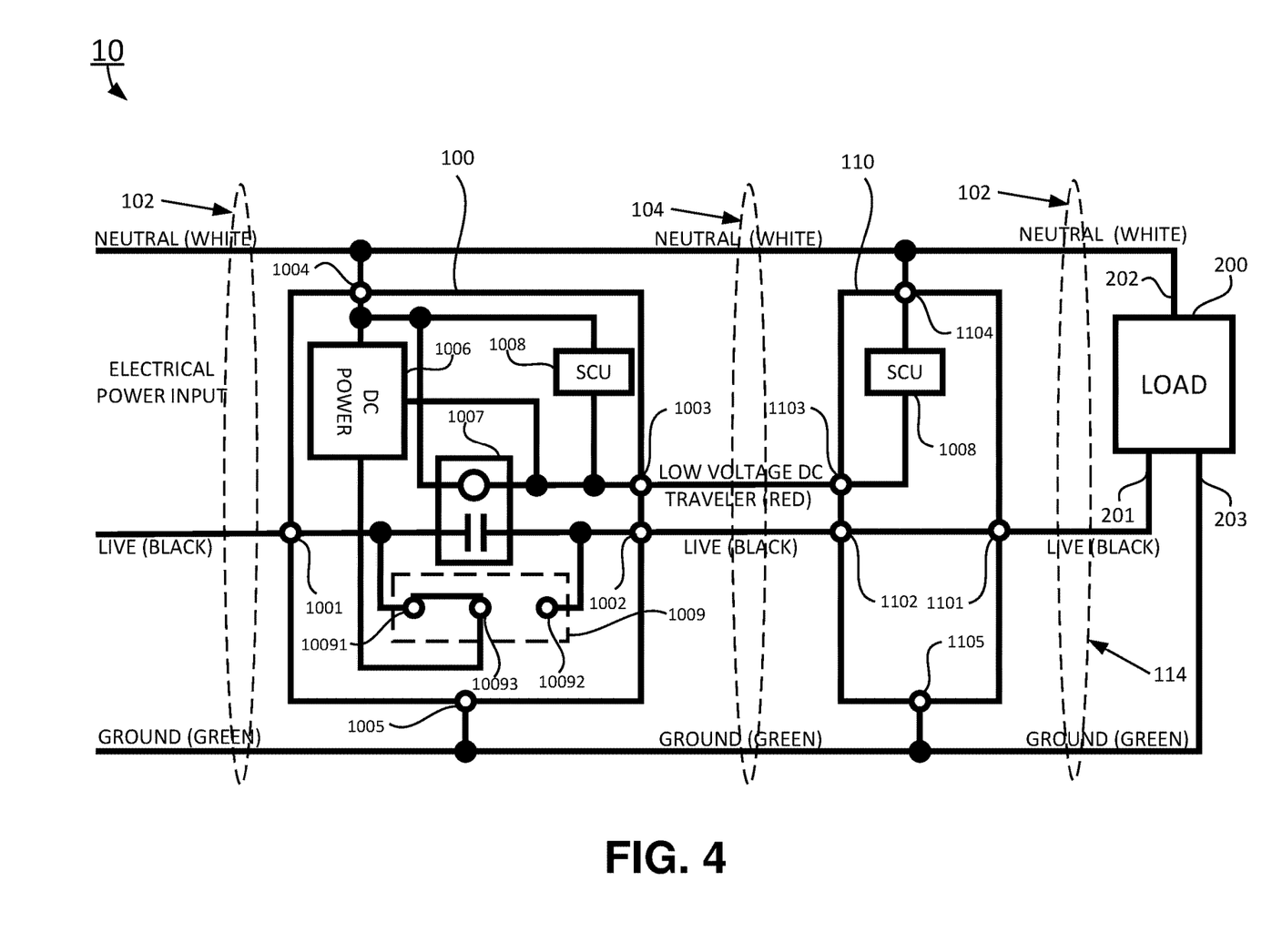
FIG. 4 shows an exemplary intelligent three-way switch system having the intelligent three-way master switch connected to electrical power input, and the intelligent three-way slave switch connected to a load according to one embodiment of the present disclosure.
Figure 5:
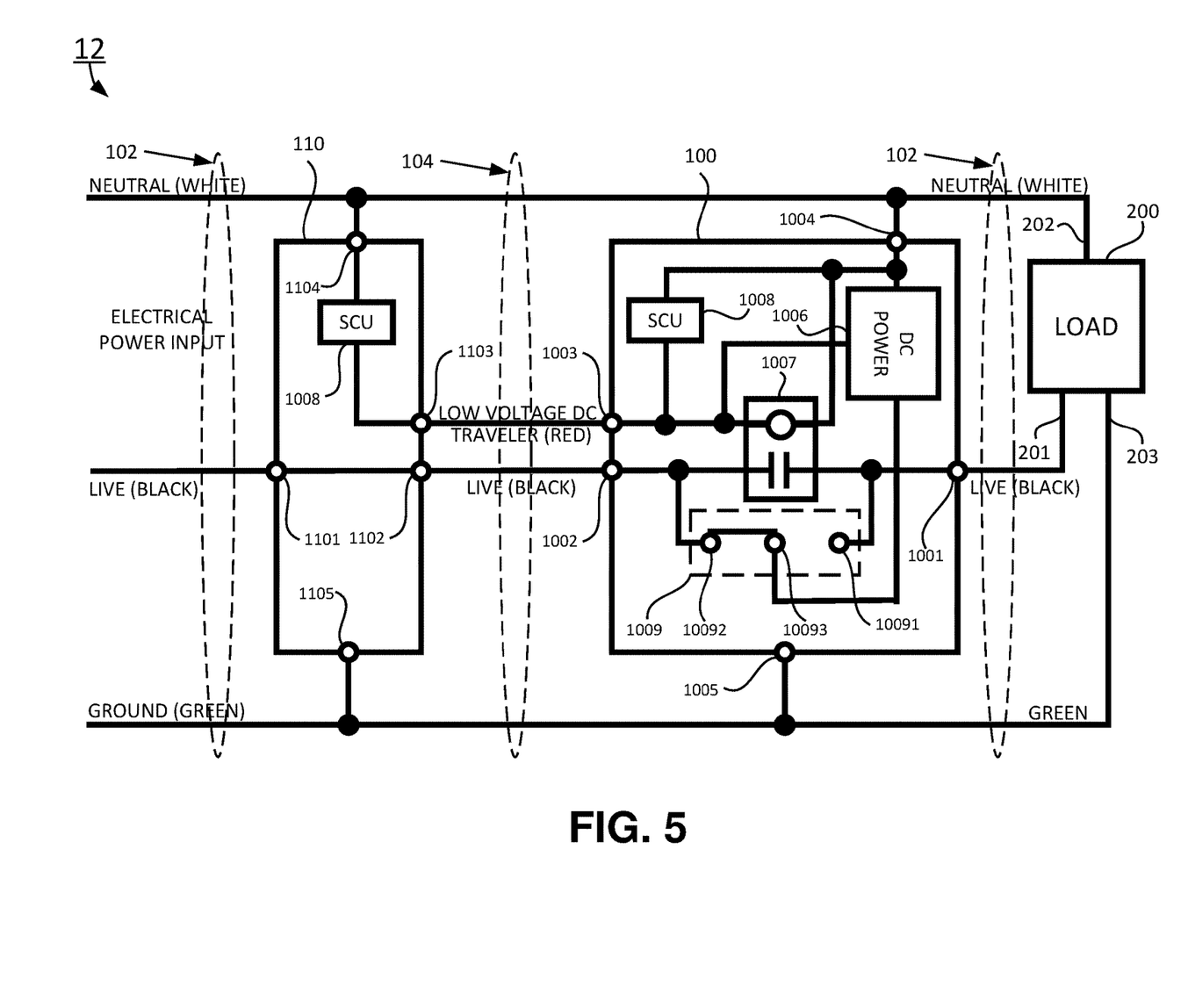
FIG. 5 shows another exemplary intelligent three-way switch system having the intelligent three-way slave switch connected to the electrical power input, and the intelligent three-way master switch connected to the load according to another embodiment of the present disclosure.

In yet another aspect, as shown in FIG. 4 and FIG. 5, the current disclosure relates to an intelligent three-way switch system 10. In certain embodiments, the intelligent three-way switch system 10 includes: an intelligent three-way master switch 100, an intelligent three-way slave switch 110, and a load 200. The intelligent three-way master switch 100 includes: a master switch first live terminal 1001, a master switch second live terminal 1002, a master switch traveler terminal 1003, a master switch neutral terminal 1004, a master switch ground terminal 1005, a direct current (DC) power supply 1006, a live wire relay 1007, a switch control unit 1008, and a live input terminal selector 1009. The intelligent three-way slave switch 110 includes: a slave switch first live terminal 1101, a slave switch second live terminal 1102, a slave switch traveler terminal 1103, a slave switch neutral terminal 1104, a slave switch ground terminal 1105, and a switch control unit 1008. The load 200 includes: a load live terminal 201, a load neutral terminal 202, and a load ground terminal 203. The intelligent three-way switch system 10 controls an electrical power supply to the load 200. In certain embodiments, the load 200 includes: electrical appliances, lights, fans, alarm systems, air conditioners, washing machines, dishwashers, refrigerators, and other household electrical devices.

The intelligent three-way master switch 100, the intelligent three-way slave switch 110, and the load 200 are connected in serial. The DC power supply 1006 provides DC power to the live wire relay 1007, the switch control unit 1008 of the intelligent three-way master switch 100, and the switch control unit 1008 of the intelligent three-way slave switch 110.

In one embodiment, as shown in FIG. 4, the intelligent three-way master switch 100 connects to the electrical power input through a three-wire electrical cable 102; the intelligent three-way slave switch 110 connects to the intelligent three-way master switch 100 through a four-wire electrical cable 104; and the load 200 connects to the intelligent three-way slave switch 110 through another three-wire electrical cable 102.

In another embodiment, as shown in FIG. 5, the intelligent three-way slave switch 110 connects to the electrical power input through the three-wire electrical cable 102; the intelligent three-way master switch 100 connects to the intelligent three-way slave switch 110 through the four-wire electrical cable 104; and the load 200 connects to the intelligent three-way master switch 100 through the three-wire electrical cable 102.

In certain embodiments, the DC power supply 1006 includes: a live wire terminal 10061 connected to the live wire of the electrical power input, and a neutral wire terminal 10062 connected to neutral wire of the electrical power input, and a low voltage DC output terminal 10063. The low voltage DC output terminal 10063 provides the low DC voltage to the switch control unit 1008 of the intelligent three-way master switch 100, the switch control unit 1008 of the intelligent three-way slave switch 110, and the live wire relay 1007 for the operation of the intelligent three-way switch system 10. In certain embodiments, the low voltage DC includes: 3.5V DC, 5.0V DC, 12V DC, 18V DC, and 24V DC.

In certain embodiments, the switch control unit 1008 is a push button switch, and when a user presses the push button, the push button switch generates a negative pulse and the negative pulse is transmitted to the live wire relay 1007 over the low voltage DC output terminal 10063.

In certain embodiments, the switch control unit 1008 is a Wi-Fi controlled switch. The user uses an APP on a smart phone to send a control instruction to the Wi-Fi controlled switch over a communication network or a Wi-Fi area network, and the Wi-Fi controlled switch generates the negative pulse and the negative pulse is transmitted to the live wire relay 1007 over the low voltage DC output terminal 10063.

In certain embodiments, the switch control unit 1008 is a light sensor switch. When light intensity at the light sensor switch reaches a predetermined level, the light sensor switch generates the negative pulse and the negative pulse is transmitted to the live wire relay 1007 over the low voltage DC output terminal 10063.

In certain embodiments, the switch control unit 1008 is a motion sensor switch. When one or more people enter the space around the motion sensor switch, the motion sensor switch detects the motion and generates the negative pulse. The negative pulse is transmitted to the live wire relay 1007 over the low voltage DC output terminal 10063.

In certain embodiments, the switch control unit 1008 is a touch panel switch. When the user touches the touch panel switch, the touch panel switch generates the negative pulse. The negative pulse is transmitted to the live wire relay 1007 over the low voltage DC output terminal 10063.

In certain embodiments, when at least one of the switch control unit 1008 of the intelligent three-way master switch 100 and the switch control unit 1008 of the intelligent three-way slave switch 110 receives switch control instructions, the switch control unit 1008 generates the negative pulse at the switch control unit first terminal 10081, and the live wire relay 1007 detects the negative pulse generated at the switch control unit first terminal 10081 and turns "ON" or "OFF" the electrical power to the load 200.

In certain embodiments, the live wire relay 1007 includes: DC control terminals 10071 having a positive DC control terminal 100711 and a negative DC control terminal 100712, and live wire switch terminals 10072 having a first live wire terminal 100721 and a second live wire terminal 100722. When the live wire relay 1007 is in an "ON" state, the first live wire terminal 100721 and the second live wire terminal 100722 are connected. When the live wire relay 1007 is in an "OFF" state, the first live wire terminal 100721 and the second live wire terminal 100722 are disconnected.

In certain embodiments, when at least one of the switch control unit 1008 of the intelligent three-way master switch 100 and the switch control unit 1008 of the intelligent three-way slave switch 110 receives switch control instructions, and the negative pulse at the switch control unit first terminal 10081 is generated, the live wire relay 1007 detects the negative pulse generated and changes the state. When the live wire relay 1007 is in the "ON" state, the first live wire terminal 100721 and the second live wire terminal 100722 are disconnected. When the live wire relay 1007 is in the "OFF" state, the first live wire terminal 100721 and the second live wire terminal 100722 are connected.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An intelligent three-way master switch, comprising:
   a master switch first live terminal, a master switch second live terminal, a master switch traveler terminal, a master switch neutral terminal, and a master switch ground terminal;
   a switch control unit, wherein the switch control unit receives one or more switch control instructions and controls a live wire relay; and
   the live wire relay, wherein the live wire relay detects a negative pulse from the switch control unit, and turns "ON" or "OFF" an electrical power between the master switch first live terminal and the master switch second live terminal;
   a live input terminal selector, wherein the live input terminal selector comprises a first input terminal, a second input terminal, and an output terminal, wherein when an electrical power input is connected through a three-wire electrical cable, the first input terminal is connected to the output terminal, and when the electrical power input is connected through a four-wire electrical cable, the second input terminal is connected to the output terminal, and
   a direct current (DC) power supply, wherein the DC power supply receives the electrical power through the live input terminal selector, and provides a low DC voltage for the operation of an intelligent three-way master switch.

2. The intelligent three-way master switch according to claim 1, wherein when the electrical power input is connected through the three-wire electrical cable to the master switch first live terminal, the master switch neutral terminal, and the master switch ground terminal respectively, an electrical power output is connected through the four-wire electrical cable to the master switch second live terminal, the master switch traveler terminal, the master switch neutral terminal, and the master switch ground terminal respectively.

3. The intelligent three-way master switch according to claim 2, wherein when the electrical power input is connected through the four-wire electrical cable to the master switch second live terminal, the master switch traveler terminal, the master switch neutral terminal, and the master switch ground terminal respectively, the electrical power output is connected through the three-wire electrical cable to the master switch first live terminal, the master switch neutral terminal, and the master switch ground terminal respectively.

4. The intelligent three-way master switch according to claim 3, wherein the DC power supply comprises: a live wire terminal connected to a live wire of the electrical power input, and a neutral wire terminal connected to neutral wire of the electrical power input, and a low voltage DC output terminal, wherein the low voltage DC output terminal provides the low DC voltage for an operation of the intelligent three-way master switch.

5. The intelligent three-way master switch according to claim 4, wherein the switch control unit comprises:
   a push button switch;
   a Wi-Fi controlled switch;
   a light sensor switch;
   a motion sensor switch;
   a touch panel switch; and
   any combination thereof.

6. The intelligent three-way master switch according to claim 5, wherein the switch control unit comprises: a switch control unit first terminal and a switch control unit second terminal, and the switch control unit first terminal is connected to the low voltage DC output terminal, wherein when the switch control unit receives the one or more switch control instructions, the switch control unit generates the negative pulse at the switch control unit first terminal.

7. The intelligent three-way master switch according to claim 6, wherein the live wire relay comprises: DC control terminals having a positive DC control terminal and a negative DC control terminal, and live wire switch terminals having a first live wire terminal and a second live wire terminal, wherein when the live wire relay is in an "ON" state, the first live wire terminal and the second live wire terminal are connected, and when the live wire relay is in an "OFF" state, the first live wire terminal and the second live wire terminal are disconnected.

8. The intelligent three-way master switch according to claim 7, wherein when the switch control unit receives the one or more switch control instructions, and the negative pulse at the switch control unit first terminal is generated, the live wire relay detects the negative pulse generated and changes the state, when the live wire relay is in the "ON" state, the first live wire terminal and the second live wire terminal are disconnected, and when the live wire relay is in the "OFF" state, the first live wire terminal and the second live wire terminal are connected.

9. An intelligent three-way slave switch, comprising:
   a slave switch first live terminal, a slave switch second live terminal, a slave switch traveler terminal, a slave switch neutral terminal, and a slave switch ground terminal; and
   a switch control unit, wherein the switch control unit comprises: a switch control unit first terminal and a switch control unit second terminal;
   wherein the switch control unit first terminal is connected to the slave switch traveler terminal to receive a low voltage DC power supply, wherein when the switch control unit receives one or more switch control instructions, the switch control unit generates a negative pulse at the switch control unit first terminal and the negative pulse is sent to an intelligent three-way master switch to turn "ON" or "OFF" an electrical power supply through the slave switch traveler terminal.

10. The intelligent three-way slave switch according to claim 9, wherein when an electrical power input is connected through a three-wire electrical cable to the slave switch first live terminal, the slave switch neutral terminal, and the slave switch ground terminal respectively, the electrical power output is connected through a four-wire electrical cable to the slave switch second live terminal, the slave switch traveler terminal, the slave switch neutral terminal, and the slave switch ground terminal respectively.

11. The intelligent three-way slave switch according to claim 10, wherein when the electrical power input is connected through the four-wire electrical cable to the slave switch second live terminal, the slave switch traveler terminal, the slave switch neutral terminal, and the slave switch ground terminal respectively, the electrical power output is connected through the three-wire electrical cable to the slave switch first live terminal, the slave switch neutral terminal, and the slave switch ground terminal respectively.

12. The intelligent three-way slave switch according to claim 9, wherein the switch control unit comprises:
a push button switch;
a Wi-Fi controlled switch;
a light sensor switch;
a motion sensor switch;
a touch panel switch; and
any combination thereof.

13. An intelligent three-way switch system, comprising:
an intelligent three-way master switch, wherein the intelligent three-way master switch comprises: a master switch first live terminal, a master switch second live terminal, a master switch traveler terminal, a master switch neutral terminal, a master switch ground terminal, a direct current (DC) power supply, a live wire relay, a switch control unit, and a live input terminal selector;
an intelligent three-way slave switch, wherein the intelligent three-way slave switch comprises: a slave switch first live terminal, a slave switch second live terminal, a slave switch traveler terminal, a slave switch neutral terminal, a slave switch ground terminal, and a switch control unit; and
a load, wherein the load comprises a load live terminal, a load neutral terminal, and a load ground terminal, and the intelligent three-way switch system controls an electrical power supply to the load,
wherein the intelligent three-way master switch, the intelligent three-way slave switch, and the load are connected in serial, and the DC power supply provides DC power to the live wire relay, the switch control unit of the intelligent three-way master switch, and the switch control unit of the intelligent three-way slave switch for an operation of the intelligent three-way switch system.

14. The intelligent three-way switch system according to claim 13, wherein the intelligent three-way master switch connects to the electrical power input through a three-wire electrical cable; the intelligent three-way slave switch connects to the intelligent three-way master switch through a four-wire electrical cable; and the load connects to the intelligent three-way slave switch through the three-wire electrical cable.

15. The intelligent three-way switch system according to claim 13, wherein the intelligent three-way slave switch connects to the electrical power input through the three-wire electrical cable; the intelligent three-way master switch connects to the intelligent three-way slave switch through the four-wire electrical cable; and the load connects to the intelligent three-way master switch through the three-wire electrical cable.

16. The intelligent three-way switch system according to claim 13, wherein the DC power supply comprises: a live wire terminal connected to the live wire of the electrical power input, and a neutral wire terminal connected to neutral wire of the electrical power input, and a low voltage DC output terminal, wherein the low voltage DC output terminal provides the low DC voltage for the operation of the intelligent three -way switch system.

17. The intelligent three-way switch system according to claim 13, wherein the switch control unit comprises:
a push button switch;
a Wi-Fi controlled switch;
a light sensor switch;
a motion sensor switch;
a touch panel switch; and
any combination thereof.

18. The intelligent three-way switch system according to claim 13, wherein when at least one of the switch control unit of the intelligent three -way master switch and the switch control unit of the intelligent three-way slave switch receives one or more switch control instructions, the switch control unit generates a negative pulse at a switch control unit first terminal, and the live wire relay detects the negative pulse generated at the switch control unit first terminal and turns "ON" or "OFF" the electrical power to the load.

19. The intelligent three-way switch system according to claim 18, wherein the live wire relay comprises: DC control terminals having a positive DC control terminal and a negative DC control terminal, and live wire switch terminals having a first live wire terminal and a second live wire terminal, wherein when the live wire relay is in an "ON" state, the first live wire terminal and the second live wire terminal are connected, and when the live wire relay is in an "OFF" state, the first live wire terminal and the second live wire terminal are disconnected.

20. The intelligent three-way switch system according to claim 19, wherein when at least one of the switch control unit of the intelligent three -way master switch and the switch control unit of the intelligent three-way slave switch receives the one or more switch control instructions, and the negative pulse at the switch control unit first terminal is generated, the live wire relay detects the negative pulse generated and changes the state, when the live wire relay is in the "ON" state, the first live wire terminal and the second live wire terminal are disconnected, and when the live wire relay is in the "OFF" state, the first live wire terminal and the second live wire terminal are connected.

* * * * *